(12) United States Patent
Loomis et al.

(10) Patent No.: US 11,261,607 B2
(45) Date of Patent: Mar. 1, 2022

(54) WALLBOARDS, WALLBOARD SYSTEMS AND METHODS FOR INSTALLING THEM

(71) Applicant: CertainTeed Gypsum, Inc., Malvern, PA (US)

(72) Inventors: Garrett Loomis, Northborough, MA (US); David Knutson, Lunenburg, MA (US); Rachel Z. Pytel, Newtown, MA (US); Dennis Michaud, Groton, CT (US); John C. Phillips, Seminole, FL (US); Stephen W. Reynolds, Mississauga (CA)

(73) Assignee: CertainTeed Gypsum, Inc., Malvern, PA (US)

( * ) Notice: Subject to any disclaimer, the term of this patent is extended or adjusted under 35 U.S.C. 154(b) by 0 days.

(21) Appl. No.: 16/231,575

(22) Filed: Dec. 23, 2018

(65) Prior Publication Data
US 2019/0203478 A1     Jul. 4, 2019

Related U.S. Application Data

(60) Provisional application No. 62/651,102, filed on Mar. 31, 2018, provisional application No. 62/612,369, (Continued)

(51) Int. Cl.
*E04F 13/04* (2006.01)
*E04F 13/02* (2006.01)
(Continued)

(52) U.S. Cl.
CPC .............. *E04F 13/02* (2013.01); *C04B 28/14* (2013.01); *E04F 13/04* (2013.01); *E04F 13/042* (2013.01); *C04B 2111/00672* (2013.01)

(58) Field of Classification Search
CPC .... E04F 13/0891; E04F 13/06; E04B 2/7457; E04B 2/723
See application file for complete search history.

(56) References Cited

U.S. PATENT DOCUMENTS 2,342,859 A * 2/1944 Hay ...................... E04B 2/7457
52/453
2,814,080 A * 11/1957 Tvorik .................. E04F 13/042
52/417
(Continued)

FOREIGN PATENT DOCUMENTS

| CN | 2623764 Y | 7/2004 |
|---|---|---|
| EP | 782 750 B1 | 1/2016 |
| JP | 2002127348 A | 5/2002 |

OTHER PUBLICATIONS

International Search Report issued in co-pending International Patent Application No. PCT/US2018/067434, ISA/KR Korean Patent Office, dated Apr. 23, 2019, 5 pages.
(Continued)

*Primary Examiner* — Gisele D Ford
(74) *Attorney, Agent, or Firm* — McDonnell Boehnen Hulbert & Berghoff LLP

(57) ABSTRACT

The present disclosure relates generally to wallboards, for example, suitable for use in constructing internal walls. The present disclosure relates more particularly to a wallboard and a method that provides simplified high-quality surface finishing. The wallboard includes a wall panel having a front surface and a rear surface. A sandable coating is disposed on the front surface of the wall panel. The method includes positioning wallboards adjacent to one another, applying sandable joint compound over joint formed between the wallboards, and sanding the joint compound and the sandable coating of the wallboards.

29 Claims, 5 Drawing Sheets

Related U.S. Application Data filed on Dec. 30, 2017, provisional application No. 62/611,598, filed on Dec. 29, 2017.

(51) Int. Cl.
*C04B 28/14* (2006.01)
*C04B 111/00* (2006.01)

(56) References Cited

U.S. PATENT DOCUMENTS

| | | | |
|---|---|---|---|
| 3,385,019 A * | 5/1968 | Frank | E04F 13/042 |
| | | | 52/417 |
| 2,422,587 A | 1/1969 | Murray et al. | |
| 3,675,383 A * | 7/1972 | Paoletti | E04B 2/7457 |
| | | | 52/222 |
| 3,708,935 A * | 1/1973 | Kossuth | E04B 2/7457 |
| | | | 52/416 |
| 4,392,336 A * | 7/1983 | Ganssle | E04B 2/7457 |
| | | | 52/317 |
| 5,230,200 A | 7/1993 | Douglas et al. | |
| 5,311,717 A * | 5/1994 | Yount | E04B 2/7457 |
| | | | 52/417 |
| 5,628,159 A * | 5/1997 | Younts | E04B 2/7457 |
| | | | 52/417 |
| 7,469,510 B2 | 12/2008 | Colbert et al. | |
| 8,151,532 B2 | 4/2012 | Zuber et al. | |
| 2003/0208977 A1* | 11/2003 | House | E04F 13/04 |
| | | | 52/459 |
| 2004/0154264 A1 | 8/2004 | Colbert et al. | |
| 2005/0252128 A1 | 11/2005 | Colbert et al. | |
| 2008/0302047 A1* | 12/2008 | Schraga | E04F 13/04 |
| | | | 52/460 |
| 2012/0031555 A1 | 2/2012 | Thompson et al. | |
| 2015/0007519 A1* | 1/2015 | Negri | E04F 13/0898 |
| | | | 52/417 |
| 2015/0083303 A1 | 3/2015 | Negri et al. | |
| 2019/0383034 A1* | 12/2019 | Negri | E04F 13/042 |

OTHER PUBLICATIONS

Written Opinion issued in co-pending International Patent Application No. PCT/US2018/067434, ISA/KR Korean Patent Office, dated Apr. 23, 2019, 6 pages.

* cited by examiner

WALLBOARDS, WALLBOARD SYSTEMS AND METHODS FOR INSTALLING THEM

CROSS-REFERENCE TO RELATED APPLICATIONS

This application claims the benefit of priority of U.S. Provisional Patent Application No. 62/611,598, filed Dec. 29, 2017; U.S. Provisional Patent Application No. 62/612,369, filed Dec. 30, 2018; and U.S. Provisional Patent Application No. 62/651,102, filed Mar. 31, 2018, each of which is hereby incorporated herein by reference in its entirety.

BACKGROUND OF THE DISCLOSURE

1. Field of the Disclosure

The present disclosure relates generally to wallboards, for example, suitable for use in constructing internal walls. The present disclosure relates more particularly to a wallboard including a sandable coating on a front surface thereof.

2. Technical Background

Wallboards, for example gypsum wallboards that are commonly referred to as drywall, are often used to construct internal walls. The wall is framed with wooden or metal framing elements, such as studs, and the wallboards are hung on the frame using screws or other fasteners. Once the wallboards are hung, they provide a surface that forms the wall and is substantially flat. However, at the joints between adjacent wallboards and in the areas where the fasteners are inserted into the wallboards, the wall surface is not flat; these details cannot be covered over simply with paint.

In order to conceal the joints and fasteners, the wall is typically "finished" by covering the joints and fasteners with a joint compound. The finishing of the wall provides a uniformly smooth surface for paint or wall paper, so that the fasteners and the joints are not visible. The type of finish applied to the wall and the amount of effort used to achieve that finish can vary significantly based on the importance of achieving a visibly uniform surface and the lighting on the wall.

When a high quality finish is desired to accommodate a certain type of paint or certain lighting, the process for finishing the wall can be very laborious and require a skilled craftsman. For example, to achieve a level 5 finish according to the standard set collectively by five trade associations (AWCI, CISCA, DWFC, PDCA and GA), the wall finisher must apply at least two coats of joint compound over flat joints, cover the fasteners with joint compound, and apply a skim coat over the entire wall surface. In addition to applying the different layers of coating, the finisher must allow the coats to dry and sand away defects to produce a smooth, monolithic surface. The finished wall must be smooth and free of tool marks or ridges. The process is expensive and takes multiple days to complete. In addition, the process is artisanal and requires skill to avoid unsightly defects.

What is needed is a wallboard that allows a high quality finish to be achieved more efficiently and with less expertise.

SUMMARY OF THE DISCLOSURE

In one aspect, the present disclosure provides a wallboard enabling simplified high-quality surface finishing, comprising:
  a wall panel including a front surface, a rear surface, and opposing first and second side edges; and
  a sandable coating disposed on the front surface of the wall panel.

In another aspect, the disclosure provides a system enabling high-quality surface finishing of wallboards, the system comprising:
  at least two wallboards each including
    a wall panel having a front surface, a rear surface, and opposing first and second side edges, and
    a sandable coating disposed on the front surface of the wall panel; and
  a sandable joint compound configured to cover a joint between the at least two wallboards.

In another aspect, the disclosure provides a method of forming a high quality finish on a wall surface, the method comprising:
  providing first and second wallboards each including
    a wall panel having a front surface, a rear surface, and opposing first and second side edges, and
    a sandable coating disposed on the front surface of the wall panel;
  positioning the first wallboard adjacent to the second wallboard so as to form a wall surface with a joint between the first and second wallboards;
  applying a mass of sandable joint compound over the joint, the mass of joint compound extending at least from the coating of the first wallboard to the coating of the second wallboard; and
  sanding at least a portion of the coating of the first wallboard, at least a portion of the coating of the second wallboard, and the joint compound so as to form the high quality finish on the wall surface.

In one aspect, the present disclosure provides a method for making a wallboard enabling simplified high-quality surface finishing, comprising:
  providing a wall panel including a front surface, a rear surface, and opposing first and second side edges; and
  forming a sandable coating disposed on the front surface of the wall panel.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1:
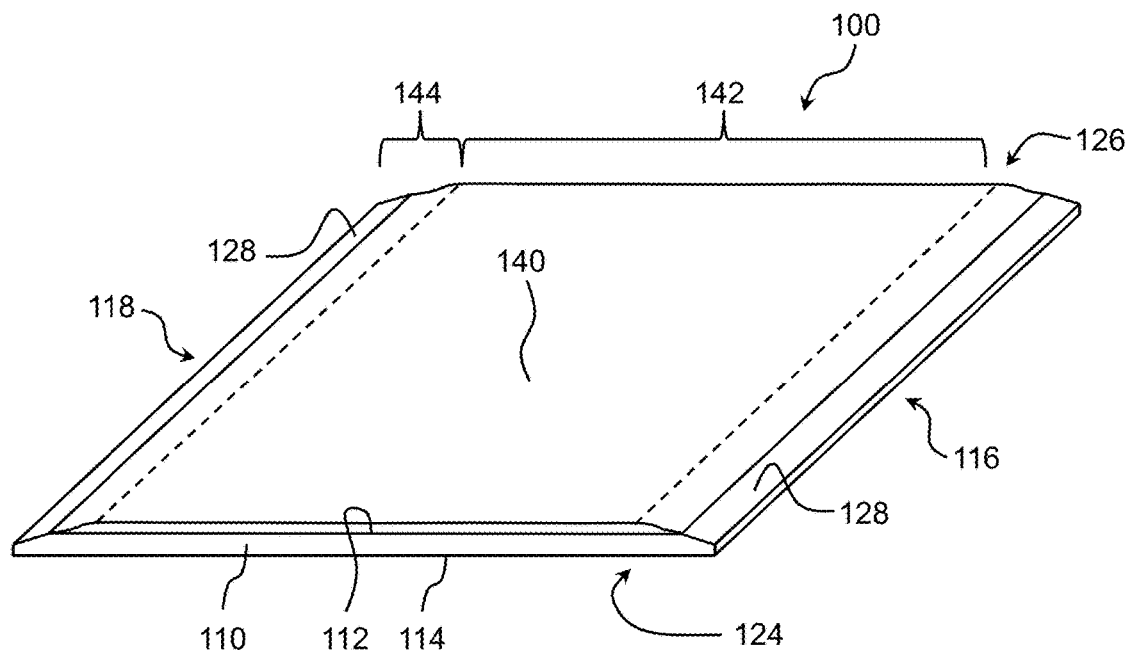
FIG. 1 is a schematic perspective view of a wallboard according to one embodiment of the disclosure.
Figure 2:
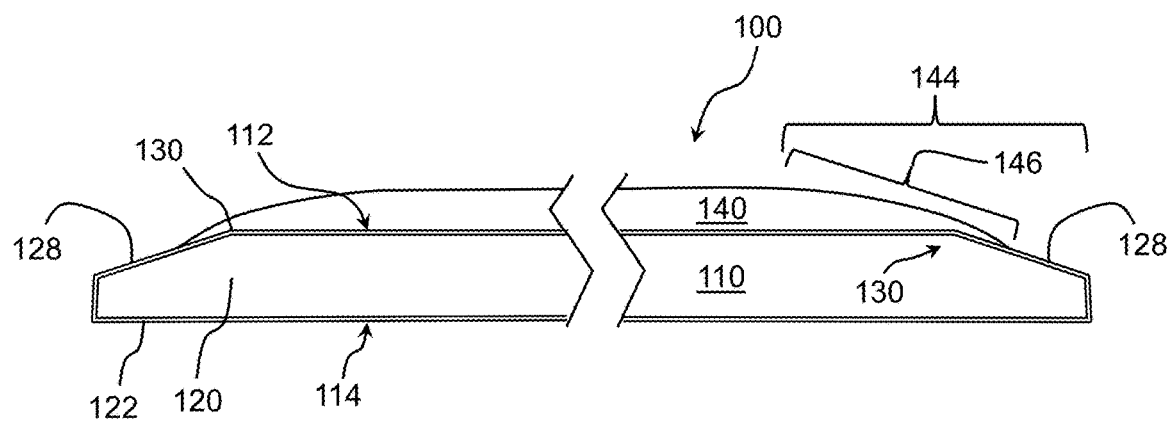
FIG. 2 is a schematic cross sectional side view of the wallboard of FIG. 1.

As described above, the present inventors have noted that the conventional process for creating a high quality finish of wallboard is time consuming and costly. Accordingly, one aspect of the disclosure is a wallboard including a wall panel and a sandable coating on a front surface of the wall panel. Such a wallboard is shown in a schematic perspective view in FIG. 1 and in a schematic cross sectional side view in FIG. 2. Wallboard 100 includes a wall panel 110 having a front surface 112, a rear surface 114 and opposing first and second side edges 116, 118. A sandable coating 140 is disposed on the front surface 112 of the wall panel 110.

The person of ordinary skill in the art will appreciate that the wall panel can have a variety of different constructions. In certain embodiments of the wallboards as otherwise described herein, the wall panel includes a core that is covered by a facing, e.g., in the form of a sheet. In other embodiments, the wall panel is made without a facing disposed between a core and the sandable coating. As the person of ordinary skill in the art will appreciate, facings can be disposed on both the front surface and the rear surface of the core, or only on one or the other. Facings can extend onto the first and/or second side edges, as will be apparent to the person of ordinary skill in the art. For example, in the embodiment of FIGS. 1 and 2, facing 122 is disposed on the front and rear surfaces, and on both side edges of the core (i.e., generally at surfaces 112 and 114 and edges 116 and 118 of the wall panel).

The person of ordinary skill in the art will appreciate that the core of a wall panel as described herein can be formed of a variety of materials. In certain embodiments, the core of the wall panel is formed from a gypsum plaster. In other embodiments, the core of the wall panel is formed from a struvite-K/syngenite plaster, such as a material described in International Patent Application Publication no. 2015/057732, which is hereby incorporated herein by reference in its entireties. Various additional materials suitable for use as a core of the wall panel include concrete, fiber-reinforced materials, foamed polymeric materials such as foamed polystyrene, mineral board materials, mineral fiber board materials, cellulosic materials, particle board materials, oriented strand board materials, or a combination thereof. Of course, the person of ordinary skill in the art will appreciate that other suitable materials may be used. The core can include a variety of fillers and additives, as the person of ordinary skill in the art will appreciate. For example, in some embodiments, the core may include one or more fillers, for example, selected from calcium carbonate, starch, sand, ceramic microspheres, perlite, foam, fibers, fly ash, slag, or cellulosic fillers, including wood particles and fibers. Similarly, in some embodiments, the core may include one or more additives including accelerators to increase the setting time, such as BMA or potash, water resistance, such as wax or silicone, sugars, retarders, cellulosic fibers, fiberglass fibers, boric acid, fire resistance, such as vermiculite, or other additives as the person of ordinary skill in the art will appreciate. The person of ordinary skill in the art will select filler(s) and/or additive(s) based on the particular core material and the particular properties desired for the overall wallboard.

Similarly, the person of ordinary skill in the art will appreciate that a variety of materials can be used as the facing(s). For example, in certain embodiments, the facing is made of paper, a fiberglass mat, or a polymer sheet. Other facing materials may alternatively be used, as will be appreciated by a person of ordinary skill in the art.

In certain embodiments as otherwise described herein, the wall panel and corresponding wallboard may be in the shape of a rectangle, where the first and second side edges 116, 118 extend from a first end 124 to a second end 126. In many embodiments the length of the wall panel from end to end is longer than the width of the wall panel from side to side. In certain embodiments as otherwise described herein, the length of the wall panel 110 from the first end 124 to the second end 126, and the corresponding length of the wallboard 100, is in a range of 6 feet to 20 feet, or in a range of 8 feet to 16 feet, for example, 8 feet, 9 feet, 10 feet, 12 feet, 14 feet, or 16 feet. In certain embodiments as otherwise described herein, the width of the wall panel 110 from the first side edge 116 to the second side edge 118, and the corresponding width of the wallboard 100, is in a range of 36 to 72 inches, for example 48 inches or 54 inches. While the embodiment of wallboard 100 is shown as a rectangle, in other embodiments, the wall panel may have a different shape, such as a triangular or round panel, where the side edges are those edges that are generally opposed to one another.

The thickness of the wall panel and corresponding wallboard may also be selected for various design constraints as will be appreciated by a person of ordinary skill in the art. In certain embodiments as otherwise described herein, the thickness of the wallboard 100 is in a range of ⅛ inch to 1.5 inches, or in a range of ¼ inch to 1.25 inches. In certain embodiments as otherwise described herein, the thickness of the wall panel 110 is of a size commonly used in construction materials, such as ¼ inch, ½ inch, ¾ inch or 1 inch and the sandable coating adds to the overall thickness of the wallboard 100 from that size. In other embodiments, the wall panel 110 may be of a size that is slightly reduced from commonly used dimensions, so that the overall thickness of the wallboard has a size that is commonly used in construction materials. For example, the combination of the wall panel and sandable coating may have a thickness of ¼ inch, ½ inch, ¾ inch or 1 inch.

In certain embodiments as otherwise described herein, the wall panel has at least one tapered portion that extends from a respective one of the side edges. For example, in the embodiment of FIG. 1, the wall panel 110 has a tapered portion 128 at the first side edge 116 and a tapered portion 128 at the second side edge 118. In certain embodiments as otherwise described herein, the tapered portion 128 is formed by a slight slope of the front surface 112 from an inner border 130 of the tapered portion 128 toward the rear surface 114. In contrast, the rear surface 114 may be flat, and the taper may be provided entirely by the front surface 112. In certain embodiments, the tapered portion 128 may be formed by a short bevel at the corresponding edge 116, 118 of the wall panel 110, or in other embodiments the tapered portion may be formed by a longer taper of the thickness of the wall panel.

In certain embodiments as otherwise described herein, the tapered portion 128 extends at least 1 inch, e.g., at least 2 inches, from the respective side edge of the wall panel 110. And in certain embodiments as otherwise described herein, the tapered portion extends no more than 5 inches, e.g., no more than 3 inches from the respective side edge of the wall panel. For example, in certain such embodiments, the tapered portion 128 may extend from the side edge in a range of 1 to 5 inches, or in a range of 1 to 3 inches, or in a range of 2 to 3 inches, or in a range of 2 to 2.5 inches, for example 2.25 inches.

In certain embodiments as otherwise described herein, the depth of the taper (i.e., in the direction of the thickness of the wallboard) is in a range of 0.02 inches to 0.25 inches from the front surface of the wall panel. In some embodiments the taper is in a range of 0.03 inches to 0.15 inches, or in a range of 0.03 inches to 0.09 inches, for example, about 0.05 inches. In certain embodiments as otherwise described herein, the depth of the taper is in a range of 5% to 50% of a thickness of the board, e.g., in a range of 10% to 25%. In some embodiments, the edges at the ends 124, 126 of the wall panel are also tapered, such that the wall panel 110 is tapered on all four sides.

It should be understood that the sandable coating 140 is applied to the wall panel 110 before the wallboard 100 is installed on a wall frame or otherwise disposed on a wall; for example, the sandable coating 140 may be applied by a manufacturer. The sandable coating can be applied, e.g., by the manufacturer of the wall panel as a step in its manufacturing process, or by a separate manufacturer (e.g., starting with a conventional wall panel and applying and shaping the sandable coating in a separate manufacturing process). Notably, the wallboard with the sandable coating can be delivered to a jobsite, ready for the installer to use. Thus, the wallboard 100 includes the sandable coating 140 while the wallboard 100 is still free of any fasteners, such as screws or adhesive, that hold the wallboard to a wall frame. This differs from a conventional skim coat, which is only applied after the wallboard is attached to the wall frame. Accordingly, another embodiment of the disclosure is a wallboard as described herein, not installed on a structure such as a building or wall.

The term sandable coating, as used herein, refers to a coating that is capable of being smoothed by removal of small amounts of the coating without damaging the underlying board. In particular the sandable coating can be sanded without burring or marring of any underlying paper facing of the wall panel. Furthermore, the sandable coating allows for targeted removal using conventional sanding techniques without damage to the wall, which may result if the coating were too easily removable. For example, a softer coating might be susceptible to scratching or denting.

In certain embodiments as otherwise described herein, the sandable coating has a particular removal rate as determined by a sandability test. The sandability test includes applying the coating to a ½ inch plastic platen that includes 2 mm shims and air drying the coating to a constant weight. The platen is weighed and then mounted on a Gardner Abrasion and Washability/Scrubability Tester. The sanding block of the tester is lined with 150 grit sandpaper which is placed on the surface of the coating. After 25 cycles of running the sanding block over the surface of the coating, dust is removed and the sample of coating is weighed once again. In certain embodiments, using the described test, the sandable coating is removed at a rate of no more than 2 grams per 150 cm$^2$, e.g., no more than 1 gram per 150 cm$^2$, e.g., no more than 0.7 grams per 150 cm$^2$.

The person of ordinary skill in the art will appreciate that a variety of materials can be used as the sandable coating. As used herein, a sandable coating is one that is sandable using sandpaper, sanding blocks, an electric sander, or other structure as will be appreciated by a person of ordinary skill in the art. For example, the sandable coating is sandable with 150 grit sandpaper. A variety of conventional materials can be used to provide the sandable coating, including materials conventionally used as skim coatings or joint compounds in wallboard installations. For example, the coating can be highly filled polymer (e.g., a highly-filled acrylic), a cement-based composition, or a plaster composition. One embodiment of the sandable coating is Extreme All Purpose Joint Compound (CertainTeed Gypsum, Inc, Malvern, Pa.).

In certain embodiments, the sandable coating can provide additional functionality, for example, by including one or more functional components to provide a desired function to the coating. For example, in certain embodiments, the sandable coating includes an antimicrobial component or an antimold component, such as a pyrithone salt (e.g., zinc pyrithone, sodium pyrithone), 2-octyl-2H-isothiazol-3-one, carbendazim, terbutryn, 3-iodo-2-propynylbutylcarbamate, propiconazole, 2-[(thiocyanatomethyl)thio]benzothiazole, 2-(4'-thiazolyl)benzimidazole, 10,10'-oxybisphenoxyarsine, N-(fluorodichloromethylthio)phthalimide, N-dimethyl-N'-phenyl-(N'-fluorodichloromethylthio) sulfamide, or diuron. Of course, other antimicrobial/antimold components can also be used. In certain embodiments, the sandable coating includes a photocatalyst, e.g., particulate titania (including n-doped mesoporous titania), zinc oxide, and bismuth-containing materials such as $Bi_2O_3$, $BiVO_4$, $Bi_2WO_6$ and $Bi_5O_7I/Bi_2O_3$, which can provide photocatalytic reduction of a variety of species, e.g., oxides of nitrogen. In certain embodiments, the sandable coating includes a formaldehyde scavenger, e.g., alkali metabisulfite, alkali bisulfite, alkali sulfite, alkali thiosulfate, urea, ethyl acetoacetate, carbodiimide compounds, a low mole ratio melamine-urea-formaldehyde resin composition, or materials available under the tradename AGOCHEM® SAM. In certain embodiments, the sandable coating includes a fragrance. In certain embodiments, the sandable coating includes an intumescent system (e.g., a carbon source such as polyvinylalcohol, pentaerythritol or dierythritol, a blowing agent such as melamine or an HCl-releasing polymer or additive, and an acid catalyst such as ammonium polyphosphate), The person of ordinary skill in the art will select effective amounts of such components to provide the desired function and to be compatible with the sandable coating.

The sandable coating can be applied to the wall panel in a variety of manners, as will be apparent to the person of ordinary skill in the art. For example, in certain embodiments the sandable coating is applied to the wall panel by roll coating. In other embodiments, the coating is applied by spraying or by curtain coating.

In certain embodiments as otherwise described herein, the sandable coating 140 includes a main portion 142 that covers a majority of the front surface of the wall panel and has a thickness of at least 0.4 mm. In certain such embodiments, the main portion of the coating has a thickness of no more than 5 mm, e.g., no more than 3 mm. The main portion 142 of the coating 140 may be of substantially uniform thickness, for example varying no more than 0.1 mm from the average. In certain embodiments, the main portion 142 of the coating 140 may have a thickness in a range of 0.4 mm to 2 mm, or in a range of 0.5 mm to 1.5 mm, or in a range of 0.6 mm to 1.2 mm, for example, about 1 mm.

In certain embodiments as otherwise described herein, the coating 140 includes an area of reduced thickness 144 in a vicinity of at least one of the side edges 116, 118. In contrast to the main portion 142 of the sandable coating 140, the area of reduced thickness 144 has a thinner coating. As used herein, the term "in a vicinity" means within 8 inches. Thus, in certain embodiments the area of reduced thickness is confined to a section of the wallboard 100 that is no more than 8 inches from the side edges. It is also possible that the area of reduced thickness be in the vicinity of the edges at the ends 124, 126 of the wallboard 100. As described in more detail below, the area of reduced thickness 144 may include no coating at all, thereby forming an uncovered region on the front of the wall panel 110. In other embodiments, the main portion of the coating may extend all the way to the side edges 116, 118. On the other hand, the area of reduced thickness 144 may be provided in a vicinity of the edges at the ends 124, 126 of the wallboard 100.

In certain embodiments as otherwise described herein, the area of reduced thickness 144 extends at least 1.5 inches from the respective side edge 116 or 118. Likewise, in certain such embodiments, the main portion 142 of the coating 140 extends no closer to the edges than 1.5 inches. In some embodiments, the area of reduced thickness extends from the respective side edge 116 or 118 a distance in a range of 1 inch to 6 inches, or in a range of 1 inch to 4 inches, or in a range of 2 inches to 3 inches, for example about 2.25 inches or about 2.5 inches.

In certain embodiments as otherwise described herein, the area of reduced thickness 144 includes a tapered section 146 of the coating. The tapered section 146 of the coating has a gradual reduction in the coating thickness from the main portion 142 to the respective side edge 116, 118, or to a point where the coating ends and the wall panel is left uncovered. The tapered section 146 of the coating may taper over a distance in a range of 1 inch to 4 inches, or in a range of 1 inch to 3 inches, for example about 2 inches.

In certain embodiments as otherwise described herein, the coating includes a smooth transition between the area of reduced thickness 146 and the main portion 142. For example, the reduction in the thickness of the coating 140 in the area of reduced thickness 146 begins very gradually so that the edge of the area of reduced thickness is not prominent and is not visible by a person. In some embodiments, the area of reduced thickness of the coating may be aligned with the corresponding tapered portion of the wall panel. In certain embodiments, the wall panel includes a tapered portion extending from a respective one of the side edges, and wherein the area of reduced thickness extends to within 1 inch from an inner border of the tapered portion of the wall panel. For example, wall panel 120 includes a tapered portion 128 that extends from a respective side edge 116, and the area of reduced thickness 146 extends to within 1 inch from an inner border 130 of the tapered portion 128 of the wall panel 120.

Figure 3:
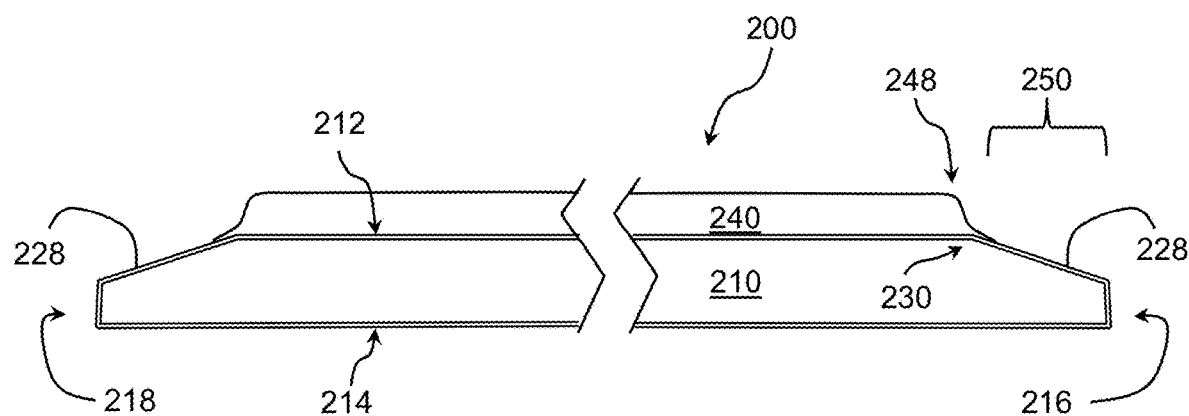
FIG. 3 is a schematic cross sectional side view of a wallboard according to another embodiment of the disclosure.

Another embodiment of a wallboard having a smooth transition of the main portion of the coating to the area of reduced thickness is illustrated in schematic cross-sectional side view in FIG. 3. Wallboard 200 includes a wall panel 210 with a front surface 212, a rear surface 214, a first side edge 216 and a second side edge 218. At each of the first and second side edges 216, 218, the wall panel 210 includes a tapered portion 218. The wallboard 200 also includes a sandable coating 240 disposed on the front surface 212 of the wall panel 210. Compared to the coating 140 in FIGS. 1 and 2, the thickness of coating 240 is reduced over a much smaller distance. Still, the transition from the main portion of the coating to the area of reduced thickness remains smooth, as the coating edge 248 is rounded. In some embodiments the coating edge 248 is disposed within 1 inch of the inner border 230 of the tapered portion 228 of the wall panel. Indeed, coating edge 248 may be disposed at the inner border 230 of tapered portion 228, as shown in FIG. 3.

In certain embodiments as otherwise described herein, the coating edge 248 is set back from the respective side edge 216 so as to form an uncovered portion 250 of the wall panel between the coating edge 248 and the respective side edge 216. The uncovered portion 250 allows a worker to hang the wallboard 200 with fasteners without having to insert the fasteners through the coating 240. Further, as described in more detail below, having the coating edge 248 set back from the side edge 216 allows the worker to use the coating edge 248 as a guide when placing joint compound over a joint between two adjacent wallboards. Specifically, the worker may be guided by the coating edge 248 to apply the joint compound only over the uncovered portion 250 of the wallboard 200.

In certain embodiments as otherwise described herein, the uncovered portion 250 extends at least 1 inch, e.g., at least 2 inches, from the respective side edge 216. In certain embodiments as otherwise described herein, the uncovered portion extends no more than 5 inches, e.g., no more than 3 inches, from the respective side edge. In certain embodiments, the uncovered portion extends in the range of 1 to 5 inches, for example 2 inches to 3 inches, from the respective side edge. In some embodiments, if the wall panel 210 includes a tapered portion 228, the uncovered portion 250 may coextend with the tapered portion 228 of the wall panel. For example, the coating edge 248 that defines the uncovered portion 250 may be located within ¼ inch from the inner border 230 of the tapered portion 228.

In certain embodiments as otherwise described herein, an uncovered portion may be included at both the side edges and the end edges of the wallboard. In other embodiments as otherwise described herein, the coating extends from the first end of the wall panel to the second end of the wall panel. Accordingly, in such cases the wallboard does not include an uncovered portion at either end of the wall panel.

Figure 4:
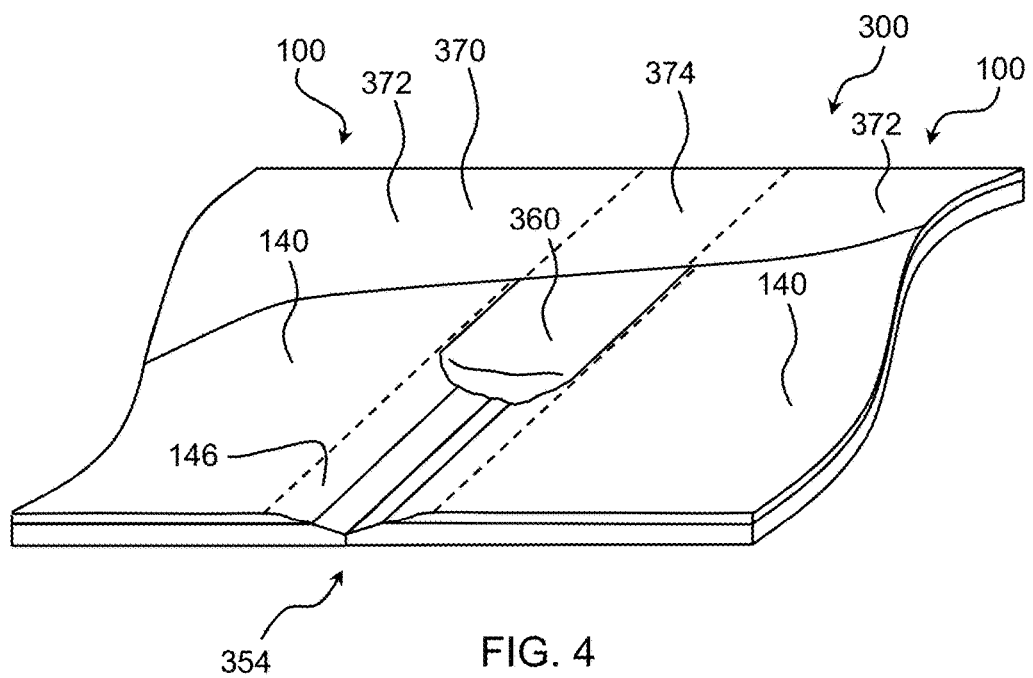
FIG. 4 is a schematic perspective view of a system including wallboards of FIGS. 1 and 2 according to one embodiment of the disclosure.

Another aspect of the disclosure is a system that simplifies high-quality surface finishing of wallboards. Such a system is shown in schematic view in FIG. 4. System 300 includes at least two wallboards as described herein, and a sandable joint compound 360 configured to cover a joint between the at least two wallboards. Specifically, the illustrated system 300 includes two wallboards 100 (e.g., according to FIGS. 1 and/or 2 described above), disposed adjacent to one another to form a joint 355 therebetween, and a joint compound 360 covering a portion of the joint 354. Of course, the system may include wallboards according to other embodiments of the disclosure, and may include more than two. Further, the system may include the wallboards before they are installed next to one another. For example, the wallboards of the system may be in a stack ready for installation. Likewise, the system may include the joint compound before it is applied over the joint. For example, the joint compound may be in a container. In this regard, the joint compound of the system may be in the form of a wet paste, or it may be in the form of a powder that is mixed with a liquid such as water before it is applied over the joint.

In certain embodiments as otherwise described herein, the joint compound is used both to embed tape in the joint, and is also used to provide a surface of the finished wall (e.g., a surface that becomes substantially coplanar with the coating). In other embodiments, the joint compound may act as a topping compound that is used in conjunction with a taping compound. For example, a taping compound may be used to embed joint reinforcement tape within the joint between wallboards, and then the joint compound 360 of system 300 may be applied over the taping compound and the tape embedded therein. In this way, the joint compound 360 may provide desired visual characteristics as described below, but may be used with other compounds that stabilize the joint reinforcement tape.

In certain embodiments as otherwise described herein, a composition of the coating 140 of the wallboards is substantially the same as a composition of the joint compound 360 (i.e., on a dry solids basis, as cured). As will be appreciated by those of ordinary skill in the art, the characterization of the compositions of the coating 140 and joint compound 360 as being the same excludes the water content of the compositions, particularly when the joint compound is a wet paste ready to be applied to the joint. However, the solid components of the coating 140 and joint compound 360 may be the same.

The person of ordinary skill in the art will appreciate that a variety of materials can be used as the joint compound. The joint compound is desirably sandable, and is desirably similarly sandable to the coating. A variety of conventional materials can be used to provide the joint compound, including materials conventionally used as joint compounds in wallboard installations. For example, the joint compounds can be highly filled polymer (e.g., a highly-filled acrylic), a cement-based composition, or a plaster composition. Any desirable weight can be used. Specific embodiments of the joint compound include One All-Purpose Joint Compound (CertainTeed Gypsum, Inc), Extreme All Purpose Joint Compound (CertainTeed Gypsum, Inc.), Plus 3® Joint Compound (USG, Chicago, Ill.), and Rapid Coat (Continental Building Products, Herndon, Va.), Sheetrock All Purpose (USG) or All-Purpose material available from National Gypsum. The joint compounds can be applied to the wall panel in a variety of manners, as will be apparent to the person of ordinary skill in the art, for example, using a trowel or a putty knife. The joint compounds can alternatively be applied using a drywall compound flat box or an automatic drywall taper.

In certain embodiments as otherwise described herein, the coating 140 of the wallboards 100 has at least one visual characteristic that matches a visual characteristic of the joint compound 360. The matching of visual characteristics as described herein includes values of a corresponding parameter measuring the visual characteristic that are close enough to one another that any distinction is not perceivable by a human eye. Likewise, a parameter that directly measures a difference between visual characteristics may be so small that a person cannot perceive a distinction between the surfaces, and as such the visual characteristics would be considered to match.

In certain embodiments as otherwise described herein, the visual characteristic is gloss. Variations in gloss along a wall are particularly noticeable because the visibility of gloss changes at different angles. In many circumstances, such as hallways, people view walls over a wide range of angles. For example, while walking along a wall, the far portions of the wall are viewed at nearly 90 degrees (from the normal vector of the wall surface) while the nearest portion of the wall is viewed at 0 degrees. Accordingly, differences in gloss can be highly noticeable.

Gloss is quantified in gloss units measured at a certain angle, with the angle being selected depending on the level of gloss, to provide a gloss measurement with a relatively low uncertainty. As used herein, the phrase "difference in gloss" refers to a difference in the gloss values of two surfaces measured at 60 degrees if both of the values are in a range from 10 gloss units to 70 gloss units when measured at that angle. If the gloss value of either surface when measured at 60 degrees is below 10, the phrase "difference in gloss" refers to the difference in the gloss value of the two surfaces when measured at 85 degrees. Likewise, if the gloss value of either surface when measured at 60 degrees is above 70, the phrase "difference in gloss" refers to the difference in the gloss value of the two surfaces when measured at 20 degrees.

In certain embodiments, the difference in gloss between the coating 140 and the joint compound 360 is no more than 15 gloss units, e.g., no more than 10 gloss units, e.g., no more than 5 gloss units, e.g., no more than 2 gloss units.

Further, the perception of differences in gloss varies depending on whether the surface has a higher gloss level or is more matte. At high gloss values (where the surface is very glossy) and at low values (where the surface is very matte), small changes in gloss are more noticeable. Thus, in certain embodiments as otherwise described herein, where the gloss value of either of two surfaces when measured at 60 degrees is outside of a range from 20 gloss units to 70 gloss units, the difference in gloss between the coating 140 and the joint compound 360 is no more than 5 gloss units, e.g., no more than 3 gloss units, e.g., no more than 2 gloss units.

In certain embodiments as otherwise described herein, the visual characteristic is surface texture. In some embodiments, a difference in the measure of surface roughness in Ra of the coating is 140 and the joint compound 360 is no more than 20%, or no more than 10%. In some embodiments, the difference in surface roughness of the coating 140 and the joint compound is no more than 2 Ra (μm), or no more than 0.4 Ra (μm), or no more than 0.2 Ra (μm).

In certain embodiments as otherwise described herein, the visual characteristic is color. In some embodiments, the color difference between the coating 140 and the joint compound 360 as measured by the CIELAB ΔE* parameter is no more than 3, or no more than 2.3, or no more than 2, or no more than 1.

Examples of the small differences in visual characteristics provided by certain embodiments of the wallboard are set out below, with reference to differences in surface roughness and gloss.

In certain embodiments as otherwise described herein, the at least two wallboards are adjacent and form a joint therebetween, and the sandable joint compound covers the joint and a portion of the sandable coating of each of the wallboards. In other words, in some embodiments, the system 300 includes the wallboards 100 and joint compound 360 assembled, for example on a wall. In such an installation of the system 300, a first of the wallboards 100 is adjacent to a second of the wallboards 100 and forms joint 354 therebetween. The joint compound 360 is disposed over the joint 354 and at least a portion of the coating 140 of each of the wallboards 100. For example, the joint compound 360 may cover the tapered section 146 of the coating 140.

In certain embodiments as otherwise described herein the system further includes a coating of paint 370 covering the coating 140 on the wallboards 100 and the joint compound 360. The coating of paint 370 has a first section 372 that covers the coating 140 on the wallboards and a second section 374 that covers the joint compound 360. At least one visual characteristic of the first section 372 of the coating of paint 370 matches a visual characteristic of the second section 374 of the coating of paint 370.

In certain embodiments as otherwise described herein, the matching visual characteristic of the first and second sections of the coating of paint is gloss. In some embodiments, the difference in gloss between the first section 372 of the coating of paint and the second section 374 of the coating of paint is no more than 15 gloss units, e.g., no more than 5 gloss units, e.g., no more than 2 gloss unit. Again, the perception of differences in gloss units varies depending on whether the surface has a higher gloss level or is more matte. Therefore, in certain embodiments as otherwise described herein, where the gloss of the coating of paint measured at 60 degrees is less than 20 gloss units or more than 70 gloss units, the difference in gloss between the first section 372 of the coating of paint and the second section 374 of the coating of paint is no more than 5 gloss units, e.g., no more than 2 gloss units In certain embodiments as otherwise described herein, the matching visual characteristic of the first and second sections of the coating of paint is surface roughness. In some embodiments, a difference in the measure of surface roughness in Ra between the first section 372 of the coating of paint and the second section 374 of the coating of paint is no more than 20%, or no more than 10%. In some embodiments, the difference in surface roughness (Ra) between the first section 372 of the coating of paint and the second section 374 of the coating of paint is no more than 1 µm, or no more than 0.2 µm, or no more than 0.1 µm.

In certain embodiments as otherwise described herein, the matching visual characteristic of the first and second sections of the coating of paint is color. In some embodiments, the color difference between the first section 372 of the coating of paint and the second section 374 of the coating of paint has a CIELAB $\Delta E^*$ value of no more than 3, or no more than 2.3, or no more than 2, or no more than 1.

The person of ordinary skill in the art will appreciate that while the wallboards described herein can be especially suitable for use as vertically-installed surfaces of buildings, they can also be used in a variety of other contexts, e.g., to define a ceiling. As used herein, the terms "wallboard," and "wall" are understood not to require verticality, but instead encompass uses as ceilings other places where building boards are used.

Figure 5A:
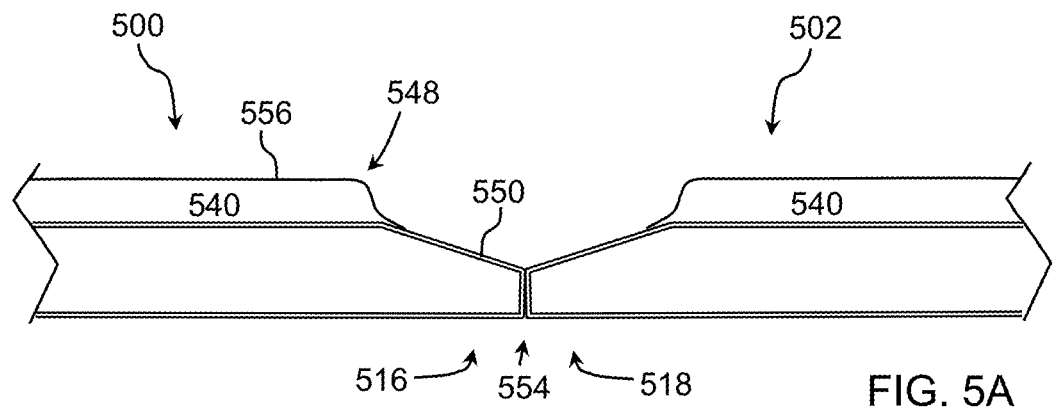
FIGS. 5A, 5B, 5C, 5D, 5E and 5F are schematic views of a process of forming a high-quality wall finish according to one embodiment of the disclosure.
Figure 5B:
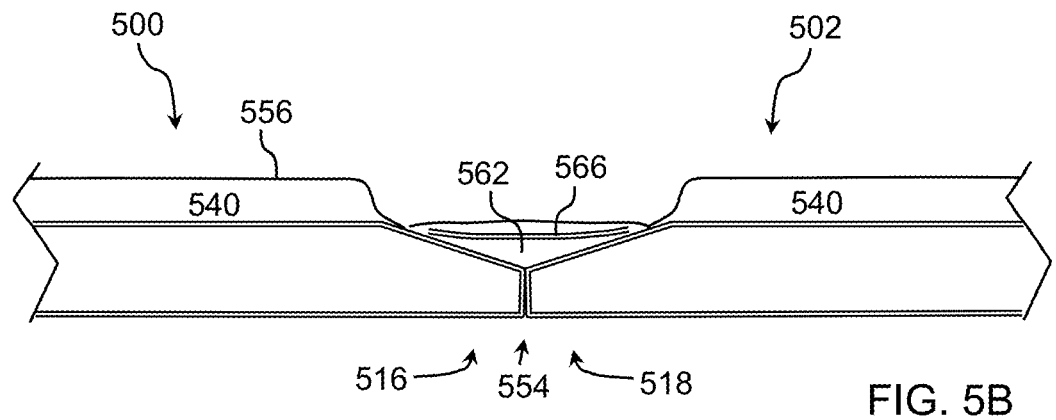
Figure 5C:
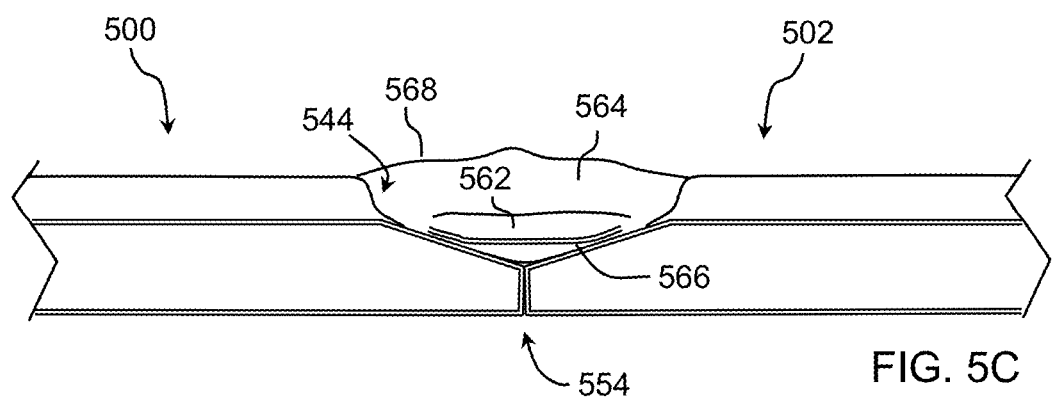
Figure 5D:
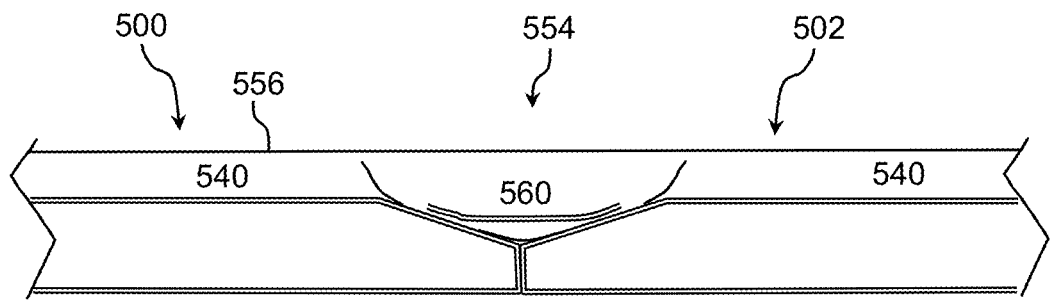

Another aspect of the present disclosure is a method of forming a high quality finish on a wall surface. The method may be understood with reference to FIGS. 5A to 5F. The method includes providing first and second wallboards 500, 502 and positioning the first wallboard 500 adjacent to the second wallboard 502 so as to form a wall surface 556 with a joint 554 between the first and second wallboards 500, 502. A mass of sandable joint compound 560 is applied over the joint (FIG. 5D). The mass of joint compound 560 extends at least from the coating 540 of the first wallboard 500 to the coating 540 of the second wallboard 502. The method also includes sanding at least a portion of the coating 540 of the first wallboard 500, at least a portion of the coating 540 of the second wallboard 502, and the joint compound 560 so as to form a high quality finish on the wall surface 556.

In certain embodiments as otherwise described herein, applying the mass of joint compound 560 over the joint includes applying a first layer 562 of joint compound over the joint 554, embedding joint reinforcement tape 566 in the first layer 562 of joint compound, drying the first layer 562 of joint compound with the joint reinforcement tape 566 embedded therein, and applying a second layer 564 of joint compound over the first layer 562 of joint compound. FIG. 5B illustrates the joint reinforcement tape 566 embedded in the first layer 562 of the joint compound and FIG. 5B shows the joint after the second layer 564 of joint compound has been applied over the first layer 562. Alternatively, a different compound may be used to embed the joint reinforcement tape 566 into the joint. For example, a layer of taping compound may be used to embed the joint reinforcement tape at the joint and the joint compound 560 may serve as a topping compound applied as a subsequent layer. As will be understood by those of ordinary skill in the art, any suitable joint reinforcement tape may be used with the present disclosure, for example paper tape or fiberglass tape. As set forth herein, the act of drying the joint compound may be actively carried out or it may be passive. Thus, the drying of the joint compound may include the application of forced air circulation and/or heat. Alternatively, allowing the joint compound to dry over time also constitutes a step of drying the joint compound.

In certain embodiments as otherwise described herein, the sanding of the portion of the coating of the first wallboard, the portion of the coating of the second wallboard, and the joint compound reduces any protrusion or depression in the wall surface at the joint to no greater than 2 mm, or to no greater than 1 mm, or to no greater than 0.5 mm. For example, if there is a protrusion in an area of the joint, it may be sanded down to be no greater than 0.5 mm. Likewise, if there is an indentation in the area of the joint the surrounded surface may be sanded down so that the indentation is no greater than 0.5 mm.

In certain embodiments as otherwise described herein, the applying of the mass of joint compound forms a bump 568 (FIG. 5C) over the joint 554 that projects further outward from the wall surface 556 than the coatings 540 on the first and second wallboards 500, 502. The sanding of the joint compound 560 may remove the bump 568 (FIG. 5D).

In certain embodiments as otherwise described herein, the positioning of the first wallboard 500 adjacent to the second wallboard 502 includes placing a first side edge 516 of the first wallboard 500 adjacent to a second side edge 518 of the second wallboard 502. On the other hand, in some embodiments, an end of the first wallboard 500 is positioned adjacent to an end of the second wallboard 502.

In certain embodiments as otherwise described herein, the coating of the first wallboard includes an area of reduced thickness 544 in a vicinity of the first side edge 516, and the application of the joint compound covers at least a portion of the area of reduced thickness. For example, in FIG. 5C, the second layer 564 of joint compound covers the area of reduced thickness 544 of the coating 540.

In certain embodiments as otherwise described herein, the coating 540 on the first wallboard 500 includes a coating edge 548 in a vicinity of the first side edge 516 so as to form an uncovered portion 550 between the coating edge 548 and the first side edge 516. The applying of the joint compound may include using the coating edge 548 as a guide for restricting the application of the joint compound 560 to the uncovered portion 550 of the wallboard. For example, when applying the joint compound to the joint, the worker may gather the joint compound onto a taping or joint knife, and then position the knife in the joint based on the coating edge 548, so that the joint compound is applied only within the uncovered portion of the joint.

Figure 5E:
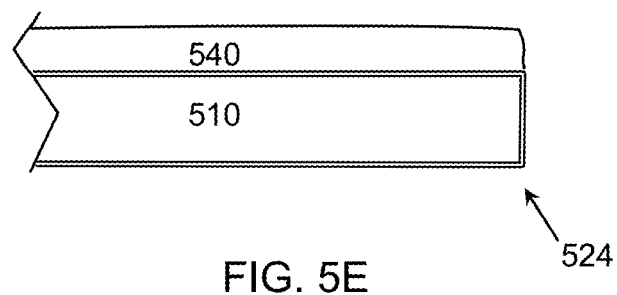
Figure 5F:
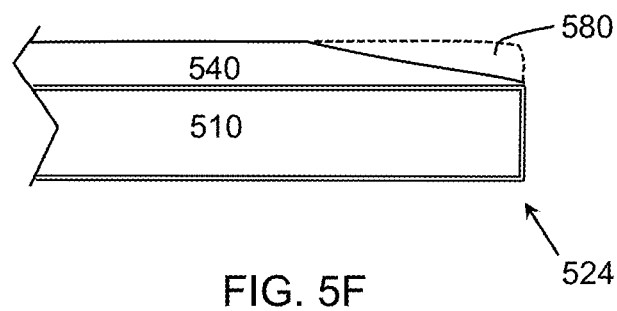

In certain embodiments as otherwise described herein, the joint compound 540 may extend all the way up to an edge of the wall panel 510, as shown in FIG. 5E. In some embodiments, the method may include, before applying the joint compound 560, removing a portion 580 of the coating 540 of at least the first wallboard in a vicinity of the joint. The applying of the joint compound may then include covering an area where the portion 580 of coating is removed. In some embodiments, the portion of coating is removed by sanding. Other tools may also be used to remove the portion of coating, as will be appreciated by those of ordinary skill in the art.

In certain embodiments as otherwise described herein, the joint compound 540 may extend up to an edge at an end 524 of the wall panel 510, and the positioning of the first wallboard adjacent to the second wallboard includes placing a first end 524 of the first wallboard 500 adjacent to a second end of the second wallboard 502. In some embodiments, the removing of a portion of the coating 580 of at least the first wallboard 500 includes removing coating at the first end 524 of the first wallboard.

In another aspect, the present disclosure provides a method for making a wallboard enabling simplified high-quality surface finishing. The method includes providing a wall panel including a front surface, a rear surface, and opposing first and second side edges; and forming a sandable coating disposed on the front surface of the wall panel. The wall panel can be made using conventional techniques, and in any of a variety of forms as described herein. Moreover, the person of ordinary skill in the art can, based on the disclosure herein, form a sandable coating of a desired low surface roughness and desired color on a surface of the wall panel. Notably, the sandable coating can be formed in a manufacturing process that is remote from the site where the wallboard is to be installed (i.e., not on or adjacent the property where the wallboard is to be installed). For example, the sandable coating can be formed on the wall panel the manufacturer of the wall panel as a step in its manufacturing process, or by a separate manufacturer (e.g., starting with a conventional wall panel and applying and shaping the sandable coating in a separate manufacturing process). Wallboards of the disclosure can then be delivered to the jobsite for installation as described herein.

Figure 6:
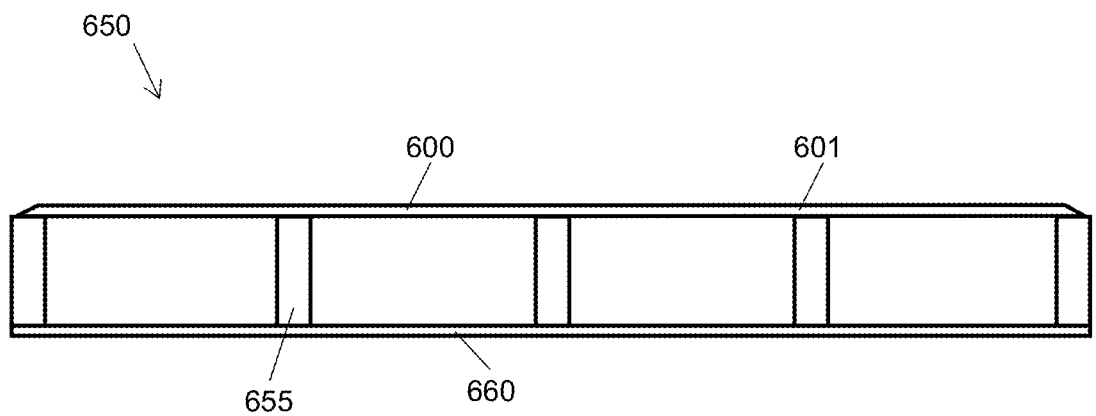
FIG. 6 is a cross-sectional view of a wall assembly according to one embodiment of the disclosure.
Figure 7:
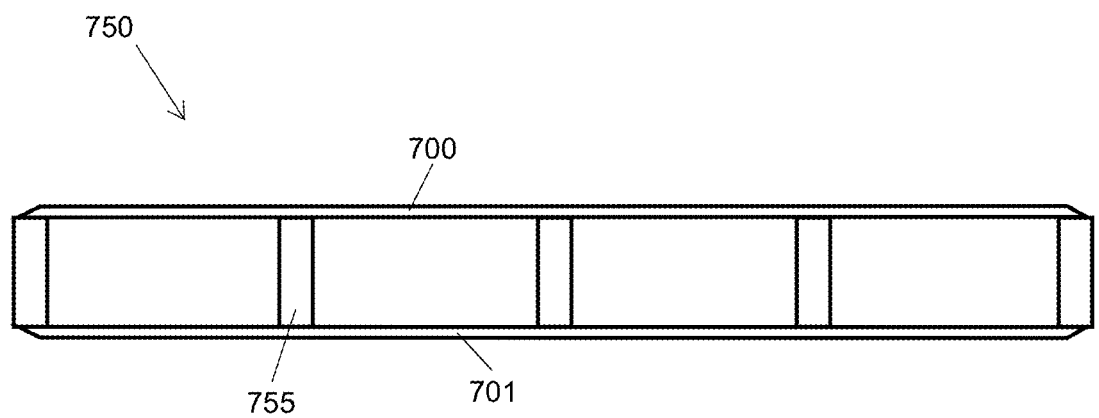
FIG. 7 is a cross-sectional view of a wall assembly according to another embodiment of the disclosure.

Similarly, one or more wallboards of the disclosure can be fabricated into a building assembly (e.g., for use as a section of a wall, a section of a ceiling, or as some other building component). An example of such a wall assembly is shown in cross-sectional view in FIG. 6. Building assembly 650 includes framing or structural members 655 (e.g., wooden 2×4s, or metal rails, wooden studs, metal studs, or channels), to which sheathing 660 and two wallboards of the disclosure 600 and 601 are attached on opposing sides thereof. Another example is shown in FIG. 7, in which building assembly 750 includes framing members 755, to which a wallboard of the disclosure 700 and 701 is attached on each opposing side thereof. As the person of ordinary skill will appreciate, the building assemblies can include a variety of other components, including but not limited to vapor barriers (e.g., disposed against the sheathing or the wallboard), weather barriers (e.g. a Tyvek™ or other housewrap disposed against the sheathing), insulation of various materials (e.g. fiberglass, cellulose, foam or stone wool insulations, disposed in space between the framing members), paint or other coatings (e.g., on the sheathing and/or the wallboard(s)) or finishes such as stucco or other weather resistant materials (e.g. disposed on the sheathing).

Such building assemblies can be prefabricated in a manufacturing process that is remote from the site where the panel assembly is to be installed, then delivered to the site and installed in or on a building. Regardless of whether a building assembly is fabricated on-site or off-site, any joints between wallboards on a single building assembly can be finished as described herein before the building assembly is installed on or in a building. For example, such joints can be finished in the manufacturing process to make the building assembly, or in a separate operation (e.g., at the site but before installation). When multiple such assemblies are installed next to one another to form joints between wallboards thereof, such joints can be finished in any manner as described herein.

Certain aspects of the disclosure are now explained further via the following non-limiting examples.

EXAMPLE 1

Surface Roughness Comparison

A joint between wallboards made in accordance with embodiments of the disclosure was prepared using Easi-Lite Gypsum Board (CertainTeed Gypsum, Inc.) as the panel with a sandable coating disposed on the surface of the panel. The sandable coating was composed of Extreme All-Purpose Joint Compound (CertainTeed Gypsum Inc.). The prepared wallboards were then mounted on a support structure forming the joint therebetween. The joint was then finished using the Extreme All-Purpose Joint Compound and smoothed. Two other joints using alternative wallboards were prepared by the same methods. A first comparison joint was formed between two Easi-Lite Gypsum Boards that did not include the sandable coating, and the joint was covered with Extreme All-Purpose Joint Compound. A second comparison joint was formed between two Rapid Deco® Level 5 (Continental Building Products, Herndon, Va.) boards and was covered with the corresponding Rapid Deco® Level 5 Joint Compound. Surface roughness measurements were conducted and the differences in surface roughness, both in RMS and Ra values, between the joint and the surface of the board were determined, as shown in Table 1.

In each of Tables 1 to 3, PP refers to the wallboards including the sandable coating, EL refers to the Easi-Lite Gypsum Boards without the sandable coating, and CRD refers to the Rapid Deco® Level 5 panels. As shown in Table 1, the difference in surface roughness between the board with the sandable coating and the joint was significantly lower than the difference in the comparison samples.

TABLE 1

| Sample | Rms (Sq) | Ra (Sa) | Unit | Difference between board and joint (μm) | | |
|---|---|---|---|---|---|---|
| | | | | RMS (Sq) | Ra (Sa) | Unit |
| CRD-Joint | 8.9 | 7.1 | μm | 2.4 | 1.9 | μm |
| CRD-Board | 6.5 | 5.1 | μm | x | x | μm |
| EL-Joint | 4.0 | 3.1 | μm | −8.4 | −6.5 | μm |
| EL-Board | 12.4 | 9.6 | μm | x | x | μm |
| PP-Joint | 3.7 | 2.9 | μm | 0.4 | 0.4 | μm |
| PP-Board | 3.3 | 2.4 | μm | x | x | μm |

Duplicate boards and corresponding joints as described above were painted and surface roughness measurements were performed. Differences in roughness between the joint and the surface of the wall panel were determined, as shown in Table 2. Again, the samples showed a difference between the section covering the board and the section covering the joint that was significantly lower for the board with sandable coating applied to the panel.

TABLE 2

| Sample | Rms (Sq) | Ra (Sa) | Unit | Difference between board and joint (μm) RMS (Sq) | Ra (Sa) | Unit |
|---|---|---|---|---|---|---|
| CRD-Joint | 5.6 | 4.5 | μm | −1.5 | −1.2 | μm |
| CRD-Board | 7.1 | 5.7 | μm | x | x | μm |
| EL-Joint | 6.1 | 4.9 | μm | −3.1 | −2.5 | μm |
| EL-Board | 9.3 | 7.4 | μm | x | x | μm |
| PP-Joint | 5.7 | 4.4 | μm | 0.2 | 0.1 | μm |
| PP-Board | 5.5 | 4.3 | μm | x | x | μm |

EXAMPLE 2

Gloss Comparison

Wallboards and corresponding joints were prepared in the same manner as in Example 1. Gloss was then evaluated at three different locations on the board using three different measurement angles, as shown in Table 3. The measurements in Table 3 show gloss values for the joint and the board that were much more similar in value for the sample using the boards with the sandable coating compared to the other samples.

TABLE 3

| Sample | Location | Joint 20 | 60 | 85 | Board 20 | 60 | 85 |
|---|---|---|---|---|---|---|---|
| PP | 1 | 1.4 | 4.7 | 18.1 | 1.4 | 4.5 | 25 |
|    | 2 | 1.4 | 4.3 | 18.8 | 1.4 | 4.2 | 24.1 |
|    | 3 | 1.4 | 4.2 | 20.7 | 1.4 | 3.9 | 21.3 |
|    | avg | 1.4 | 4.4 | 19.2 | 1.4 | 4.2 | 23.5 |
| CRD | 1 | 1.3 | 2 | 0.7 | 1.4 | 4.7 | 11.4 |
|     | 2 | 1.3 | 2 | 0.6 | 1.4 | 4.7 | 11.5 |
|     | 3 | 1.2 | 2 | 0.5 | 1.4 | 4.4 | 10.8 |
|     | avg | 1.3 | 2.0 | 0.6 | 1.4 | 4.6 | 11.2 |
| EL | 1 | 1.4 | 4.8 | 26.2 | 1.2 | 2.5 | 0.9 |
|    | 2 | 1.4 | 4.4 | 22.2 | 1.2 | 2.5 | 0.9 |
|    | 3 | 1.4 | 4.5 | 23 | 1.1 | 2.5 | 1.1 |
|    | avg | 1.4 | 4.6 | 23.8 | 1.2 | 2.5 | 1.0 |

Various aspects of the disclosure are further described by the following enumerated embodiments, which can be combined in any number and in any fashion that is not technically or logically inconsistent.

Embodiment 1. A wallboard comprising: a wall panel including a front surface, a rear surface, and opposing first and second side edges; and a sandable coating disposed on the front surface of the wall panel.

Embodiment 2. The wallboard according to Embodiment 1, wherein the wall panel comprises a core having a front surface and a facing disposed on the front surface of the core, the sandable coating being disposed on the facing.

Embodiment 3. The wallboard according to Embodiment 2, wherein the facing is paper.

Embodiment 4. The wallboard according to Embodiment 2, wherein the facing is a fiberglass mat or a polymer sheet.

Embodiment 5. The wallboard according to Embodiment 1, wherein the wall panel does not include a facing disposed on a front surface of the core.

Embodiment 6. The wallboard according to any of Embodiments 1-5, wherein the wall panel has a core formed from a gypsum plaster or a struvite-K/syngenite plaster.

Embodiment 7. The wallboard according to any of Embodiments 1 to 5, wherein the wall panel has a core formed from a material selected from concrete, fiber-reinforced materials, foamed polymeric materials such as foamed polystyrene, mineral board materials, mineral fiber board materials, cellulosic materials, particle board materials, oriented strand board materials and combinations thereof.

Embodiment 8. The wallboard according to any of Embodiments 1 to 7, wherein the wall panel has at least one tapered portion that extends from a respective one of the side edges.

Embodiment 9. The wallboard according to Embodiment 8, wherein each tapered portion of the wall panel extends at least 1 inch, e.g., at least 2 inches, from the respective side edge of the wall panel.

Embodiment 10. The wallboard according to Embodiment 8 or Embodiment 9, wherein each tapered portion of the wall panel extends no more than 5 inches, e.g., no more than 3 inches, from the respective side edge of the wall panel.

Embodiment 11. The wallboard according to Embodiment 8, wherein each tapered portion of the wall panel extends in the range of 1 to 5 inches from the respective side edge of the wall panel, for example in the range of 2 to 3 inches.

Embodiment 12. The wallboard according to any of Embodiments 8 to 11, wherein the depth of the taper is in a range of 0.02 inches to 0.25 inches from the front surface of the wall panel.

Embodiment 13. The wallboard according to any of Embodiments 1 to 13, wherein the coating includes a main portion that covers a majority of the front surface of the wall panel and has a thickness of at least 0.4 mm.

Embodiment 14. The wallboard according to Embodiment 13, wherein the main portion has a thickness of no more than 5 mm.

Embodiment 15. The wallboard according to Embodiment 13 or Embodiment 14, wherein the coating further includes an area of reduced thickness in a vicinity of at least one of the side edges.

Embodiment 16. The wallboard according to Embodiment 15, wherein the area of reduced thickness extends at least 1.5 inches from the respective side edge.

Embodiment 17. The wallboard according to Embodiment 15 or Embodiment 16, wherein the area of reduced thickness includes a tapered section of the coating.

Embodiment 18. The wallboard according to any of Embodiments 15 to 17, wherein the coating includes a smooth transition between the area of reduced thickness and the main portion.

Embodiment 19. The wallboard according to any of Embodiments 15 to 18, wherein the wall panel includes a tapered portion extending from a respective one of the side edges, and wherein the area of reduced thickness extends to within 1 inch from an inner border of the tapered portion of the wall panel.

Embodiment 20. The wallboard according to any of Embodiments 1 to 19, wherein a coating edge of the coating is set back from a respective side edge so as to form an uncovered portion of the wall panel between the coating edge and the respective side edge.

Embodiment 21. The wallboard according to Embodiment 20, wherein the uncovered portion extends at least 1 inch from the side edge.

Embodiment 22. The wallboard according to Embodiment 20 or Embodiment 21, wherein the uncovered portion extends no more than 5 inches, e.g. no more than 3 inches, from the side edge.

Embodiment 23. The wallboard according to Embodiment 20, wherein the uncovered portion extends 1 to 5 inches, for example 2 to 3 inches, from the side edge.

Embodiment 24. The wallboard according to Embodiment any of Embodiments 1 to 23, wherein the opposing first and second side edges of the wall panel extend from a first end to a second end of the wall panel, and wherein the coating extends from the first end of the wall panel to the second end of the wall panel.

Embodiment 25. The wallboard according to any of Embodiments 1 to 24, wherein the coating includes a highly filled polymer (e.g., a highly-filled acrylic), a cement-based composition, or a plaster composition.

Embodiment 26. The wallboard according to any of Embodiments 1-25, wherein the sandable coating includes one or more functional components.

Embodiment 27. The wallboard according to Embodiment 26, wherein the one or more functional components includes an antimicrobial component or an antimold component, such as a pyrithone salt (e.g., zinc pyrithone, sodium pyrithone), 2-octyl-2H-isothiazol-3-one, carbendazim, terbutryn, 3-iodo-2-propynylbutylcarbamate, propiconazole, 2-[(thiocyanatomethyl)thio]benzothiazole, 2-(4'-thiazolyl)benzimidazole, 10,10'-oxybisphenoxyarsine, N-(fluorodichloromethylthio)phthalimide, N-dimethyl-N'-phenyl-(N'-fluorodichloromethylthio) sulfamide, or diuron.

Embodiment 28. The wallboard according to Embodiment 26 or Embodiment 27, wherein the one or more functional components includes a photocatalyst, e.g., particulate titania (including n-doped titania), zinc oxide, and bismuth-containing materials such as $Bi_2O_3$, $BiVO_4$, $Bi_2WO_6$ and $Bi_5O_7I/Bi_2O_3$.

Embodiment 29. The wallboard according to any of Embodiments 26-28, wherein the one or more functional components includes a formaldehyde scavenger, e.g., alkali metabisulfite, alkali bisulfite, alkali sulfite, alkali thiosulfate, urea, ethyl acetoacetate, carbodiimide compounds, a low mole ratio melamine-urea-formaldehyde resin composition, or materials available under the tradename AGOCHEM® SAM.

Embodiment 30. The wallboard according to any of Embodiments 26-29, wherein the one or more functional components includes a fragrance.

Embodiment 31. The wallboard according to any of Embodiments 26-30, wherein the one or more functional components includes an intumescent system (e.g., a carbon source such as polyvinylalcohol, pentaerythritol or dierythritol, a blowing agent such as melamine or an HCl-releasing polymer or additive, and an acid catalyst such as ammonium polyphosphate).

Embodiment 32. The wallboard according to any of Embodiments 1 to 31, not disposed on a wall.

Embodiment 33. A building assembly comprising one or more wallboards according to any of Embodiments 1-31.

Embodiment 34. The building assembly according to Embodiment 33, not installed on or in a building.

Embodiment 35. A method for installing one or more building assemblies according to Embodiment 33, the method comprising providing the one or more building assemblies, and installing them on or in a building.

Embodiment 36. The method according to Embodiment 35, wherein the one or more building assemblies are fabricated remote from the installation site.

Embodiment 37. A system enabling simplified high-quality surface finishing of wallboards, the system comprising: at least two wallboards according to any of Embodiments 1 to 32; and a sandable joint compound configurable to cover a joint between the at least two wallboards.

Embodiment 38. The system according to Embodiment 37, wherein a composition of the coating of the at least two wallboards is the same as a composition of the joint compound.

Embodiment 39. The system according to Embodiment 37 or Embodiment 38, wherein the coating of the wallboards has at least one visual characteristic that matches a visual characteristic of the joint compound.

Embodiment 40. The system according to Embodiment 37, wherein the at least one visual characteristic includes gloss, and a difference in gloss between the coating and the joint compound is less than 10 gloss units, e.g., less than 5 gloss units, e.g., less than 2 gloss units.

Embodiment 41. The system according to Embodiment 39 or Embodiment 40, wherein the at least one visual characteristic includes surface roughness, and a difference between a surface roughness (Ra) of the coating and a surface roughness (Ra) of the joint compound is no more than 2 μm, e.g., no more than 0.4 μm, e.g., no more than 0.2 μm.

Embodiment 42. The system according to any of Embodiments 39-41, wherein the at least one visual characteristic includes color, and a difference between a color of the coating and a color of the joint compound has a CIELAB ΔE* value of no more than 3, e.g., no more than 2.3, e.g., no more than 2, e.g., no more than 1.

Embodiment 43. The system according to any of Embodiments 37-42, wherein the at least two wallboards are adjacent and form a joint therebetween, and wherein the joint compound covers the joint and a portion of the sandable coating of each of the wallboards.

Embodiment 44. The system according to any of Embodiments 37-43, further comprising a coating of paint covering the sandable coating and the sandable joint compound, the coating of paint having a first section that covers the coating on the at least two wallboards and a second section that covers the joint compound, and wherein at least one visual characteristic of the first section of the coating of paint matches a visual characteristic of the second section of the coating of paint.

Embodiment 45. The system according to Embodiment 44, wherein the at least one matching visual characteristic of the first and second sections of the coating of paint includes gloss, and a difference in gloss between the first section and the second section is less than 10 gloss units, e.g., less than 5 gloss units, e.g., less than 2 gloss units.

Embodiment 46. The system according to Embodiment 44, wherein the at least one matching visual characteristic of the first and second sections of the coating of paint includes surface roughness, and a difference between a surface roughness (Ra) of the first section and a surface roughness (Ra) of the second section is no more than 2 μm, e.g., no more than 0.2 μm, e.g., no more than 0.1 μm.

Embodiment 47. The system according to Embodiment 44, wherein the at least one matching visual characteristic of the first and second sections of the coating of paint includes color, and a difference between a color of the first section and a color of the second section has a CIELAB ΔE* value of no more than 3, e.g., no more than 2.3, e.g., no more than 2, e.g., no more than 1.

Embodiment 48. A method of forming a high quality finish on a wall surface, the method comprising:
  providing first and second wallboards each according to any of Embodiments 1 to 35;
  positioning the first wallboard adjacent to the second wallboard so as to form a wall surface with a joint between the first and second wallboards;
  applying a mass of sandable joint compound over the joint, the mass of joint compound extending at least from the coating of the first wallboard to the coating of the second wallboard; and
  sanding at least a portion of the coating of the first wallboard, at least a portion of the coating of the second wallboard, and the joint compound so as to form a high quality finish on the wall surface.

Embodiment 49. The method according to Embodiment 48, wherein the applying the mass of joint compound includes:
  applying a first layer of joint compound over the joint;
  embedding joint reinforcement tape in the first layer of joint compound;
  drying the first layer of joint compound with the joint reinforcement tape embedded therein; and
  applying a second layer of joint compound over the first layer of joint compound.

Embodiment 50. The method according to Embodiment 48 or Embodiment 49, wherein the sanding the portion of the coating of the first wallboard, the portion of the coating of the second wallboard, and the joint compound reduces any protrusion or depression in the wall surface at the joint to no greater than 2 mm, or to no greater than 1 mm, or to no greater than 0.5 mm.

Embodiment 51. The method according to any of Embodiments 48 to 50, wherein the applying the mass of joint compound forms a bump over the joint that projects further outward from the wall surface than the coatings on the first and second wallboards, and wherein the sanding the joint compound removes the bump.

Embodiment 52. The method according to any of Embodiments 48 to 51, wherein the positioning the first wallboard adjacent to the second wallboard includes placing a first side edge of the first wallboard adjacent to a second side edge of the second wallboard.

Embodiment 53. The method according to Embodiment 52 wherein the coating of the first wallboard includes an area of reduced thickness in a vicinity of the first side edge, and wherein the applying the joint compound covers at least a portion of the area of reduced thickness.

Embodiment 54. The method according to Embodiment 52, wherein the coating on the first wallboard includes a coating edge in a vicinity of the first side edge so as to form an uncovered portion between the coating edge and the first side edge, and wherein the applying the joint compound includes using the coating edge as a guide for restricting the application of the joint compound on the first wallboard to the uncovered portion of the first wallboard.

Embodiment 55. The method according to any of Embodiments 48 to 54, further comprising, before applying the joint compound, removing a portion of the coating of at least the first wallboard in a vicinity of the joint, and wherein the applying the joint compound includes covering an area where the portion of coating is removed.

Embodiment 56. The method according to Embodiment 55, wherein the portion of coating is removed by sanding.

Embodiment 57. The method according to Embodiment 55 or Embodiment 56
  wherein the opposing first and second side edges of the wall panel extend from a first end to a second end of the wall panel,
  wherein the positioning the first wallboard adjacent to the second wallboard includes placing a first end of the first wallboard adjacent to a second end of the second wallboard, and
  wherein the removing a portion of the coating of at least the first wallboard includes removing coating at the first end of the first wallboard.

Embodiment 58. The method according to any of embodiments 52-57, wherein the first wallboard is provided by a first building assembly, and the second wallboard is provided by a second building assembly.

Embodiment 59. The method according to embodiment 58, wherein positioning the first wallboard adjacent to the second wallboard so as to form a wall surface with a joint between the first and second wallboards comprises positioning the first wallboard adjacent the second wallboard.

Embodiment 60. A method for making a wallboard according to any of Embodiments 1-32, the method comprising providing a wall panel including a front surface, a rear surface, and opposing first and second side edges; and forming a sandable coating disposed on the front surface of the wall panel.

Embodiment 61. The method according to Embodiment 60, wherein the forming of the sandable coating is not performed at the site where the wallboard is to be installed.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A method of forming a high quality finish on a wall surface, the method comprising:
  positioning a first wallboard adjacent to a second wallboard so as to form a wall surface with a joint between the first and second wallboards, wherein each of the first and second wallboards of the formed wall surface comprise:
    a wall panel including a front surface, a rear surface, and opposing first and second side edges; and
    a sandable coating disposed on the front surface of the wall panel;
  subsequently applying a mass of sandable joint compound over the joint of the formed wall surface, the mass of joint compound extending at least from the sandable coating of the first wallboard to the sandable coating of the second wallboard; and
  sanding at least a portion of the sandable coating of the first wallboard, at least a portion of the sandable coating of the second wallboard, and the joint compound so as to form a high quality finish on the wall surface.

2. The method according to claim 1, wherein the applying the mass of joint compound includes:
  applying a first layer of joint compound over the joint;
  embedding joint reinforcement tape in the first layer of joint compound;
  drying the first layer of joint compound with the joint reinforcement tape embedded therein; and
  applying a second layer of joint compound over the first layer of joint compound.

3. The method according to claim 1, wherein the sanding the portion of the sandable coating of the first wallboard, the portion of the sandable coating of the second wallboard, and the joint compound reduces any protrusion or depression in the wall surface at the joint to no greater than 0.5 mm.

4. The method according to claim 1, wherein the applying the mass of joint compound forms a bump over the joint that projects further outward from the wall surface than the sandable coatings on the first and second wallboards, and wherein the sanding the joint compound removes the bump.

5. The method according to claim 1, wherein the positioning the first wallboard adjacent to the second wallboard includes placing a first side edge of the first wallboard adjacent to a second side edge of the second wallboard.

6. The method according to claim 5, wherein the sandable coating of the first wallboard includes an area of reduced thickness in a vicinity of the first side edge, and wherein the applying the joint compound covers at least a portion of the area of reduced thickness.

7. The method according to claim 5, wherein the sandable coating on the first wallboard includes a coating edge in a vicinity of the first side edge so as to form an uncovered portion between the coating edge and the first side edge, and wherein the applying the joint compound includes using the coating edge as a guide for restricting the application of the joint compound on the first wallboard to the uncovered portion of the first wallboard.

8. The method according to claim 1, further comprising, before applying the joint compound, removing a portion of the sandable coating of at least the first wallboard in a vicinity of the joint, and wherein the applying the joint compound includes covering an area where the portion of sandable coating is removed.

9. The method according to claim 8, wherein the portion of sandable coating is removed by sanding.

10. The method according to claim 8,
wherein the opposing first and second side edges of the wall panel extend from a first end to a second end of the wall panel,
wherein the positioning the first wallboard adjacent to the second wallboard includes placing a first end of the first wallboard adjacent to a second end of the second wallboard, and
wherein the removing a portion of the sandable coating of at least the first wallboard includes removing sandable coating at the first end of the first wallboard.

11. The method according to claim 1, wherein the first wallboard is provided by a first building assembly, and the second wallboard is provided by a second building assembly.

12. The method according to claim 11, wherein positioning the first wallboard adjacent to the second wallboard so as to form a wall surface with a joint between the first and second wallboards comprises positioning the first wallboard adjacent the second wallboard.

13. The method according to claim 1, wherein the sandable coating of each of the first wallboard and the second wallboard has at least one visual characteristic that matches a visual characteristic of the joint compound, the at least one visual characteristic comprising one or more of
gloss, wherein a difference in gloss between the sandable coating and the joint compound is less than 5 gloss units;
surface roughness, wherein a difference between a surface roughness (Ra) of the sandable coating and a surface roughness (Ra) of the joint compound is no more than 2 µm; and
color, wherein a difference between a color of the sandable coating and a color of the joint compound has a CIELAB ΔE* value of no more than 3.

14. The method according to claim 1, wherein in each wallboard, the wall panel comprises a core having a front surface and a facing disposed on the front surface of the core, the sandable coating being disposed on the facing and including a coating edge that is set back from a respective side edge so as to form an uncovered portion of the wall panel between the coating edge and the respective side edge.

15. The method according to claim 1, wherein in each wallboard, the wall panel has at least one tapered portion that extends from a respective one of the side edges, wherein each tapered portion of the wall panel extends at least 1 inch and no more than 5 inches from the respective side edge of the wall panel.

16. The method according to claim 1, wherein in each wallboard, the depth of the taper is in a range of 0.02 inches to 0.25 inches from the front surface of the wall panel.

17. The method according to claim 1, wherein in each wallboard, the sandable coating includes a main portion that covers a majority of the front surface of the wall panel and has a thickness of at least 0.4 mm.

18. The method according to claim 17, wherein the sandable coating further includes an area of reduced thickness in a vicinity of at least one of the side edges, the area of reduced thickness extending at least 1.5 inches from the respective side edge.

19. The method according to claim 1, wherein a coating edge of the sandable coating is set back from a respective side edge so as to form an uncovered portion of the wall panel between the coating edge and the respective side edge.

20. The method according to claim 1, wherein the sandable coating includes a highly filled polymer.

21. The method according to claim 1, wherein the sandable coating of each of the first wallboard and the second wallboard has at least one visual characteristic that matches a visual characteristic of the joint compound, the at least one visual characteristic comprising one or more of
gloss, wherein a difference in gloss between the sandable coating and the joint compound is less than 2 gloss units;
surface roughness, wherein a difference between a surface roughness (Ra) of the sandable coating and a surface roughness (Ra) of the joint compound is no more than 0.2 µm; and
color, wherein a difference between a color of the sandable coating and a color of the joint compound has a CIELAB ΔE* value of no more than 1.

22. The method according to claim 1, wherein in each of the first and second wallboards, the sandable coating includes a main portion that covers a majority of the front surface of the wall panel and has a thickness of at least 0.4 mm and no more than 5 mm.

23. The method according to claim 6, wherein in the first wallboard the sandable coating includes a smooth transition between the area of reduced thickness and the main portion.

24. The method according to claim 1, wherein in each of the first wallboard and the second wallboard a coating edge of the sandable coating is set back from a respective side edge so as to form an uncovered portion of the wall panel between the coating edge and the respective side edge, the uncovered portion extending at least 1 inch and no more than 5 inches from the side edge.

25. The method according to claim 1, wherein in each of the first wallboard and the second wallboard, the wall panel comprises a core having a front surface and a facing disposed on the front surface of the core, the sandable coating being disposed on the facing.

26. The method according to claim 1, wherein in each of the first and second wallboards the sandable coating is formed of a cement-based composition, or a plaster composition.

27. The method according to claim 1, wherein in each of the first and second wallboards the sandable coating includes an antimicrobial component or an antimold component.

28. The method according to claim 1, wherein in each of the first and second wallboards the sandable coating includes a photocatalyst.

29. The method according to claim 1, wherein in each of the first and second wallboards the sandable coating includes a formaldehyde scavenger.

* * * * *